(12) United States Patent
Bull et al.

(10) Patent No.: US 10,275,262 B1
(45) Date of Patent: Apr. 30, 2019

(54) MULTI-MODEL MODES OF ONE DEVICE

(71) Applicant: Apple Inc., Cupertino, CA (US)

(72) Inventors: William E. Bull, Campbell, CA (US); Ben A. Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/795,114

(22) Filed: Oct. 26, 2017

Related U.S. Application Data

(63) Continuation of application No. 14/262,560, filed on Apr. 25, 2014, which is a continuation of application No. 12/207,308, filed on Sep. 9, 2008, now abandoned.

(60) Provisional application No. 61/079,578, filed on Jul. 10, 2008.

(51) Int. Cl.
| | | |
|---|---|---|
| G06F 9/44 | (2018.01) | |
| G06F 9/4401 | (2018.01) | |
| H04N 21/485 | (2011.01) | |
| H04N 21/45 | (2011.01) | |
| H04N 21/414 | (2011.01) | |
| H04N 21/41 | (2011.01) | |

(52) U.S. Cl.
CPC ....... *G06F 9/4411* (2013.01); *H04N 21/4126* (2013.01); *H04N 21/41407* (2013.01); *H04N 21/4532* (2013.01); *H04N 21/4858* (2013.01)

(58) Field of Classification Search
CPC .. H02J 7/0004; H04B 1/3877; H04M 1/6041; H04M 1/72527; B60K 35/00; G06F 3/162; G06F 3/167; G06F 3/0346; G06F 9/4411; G06F 1/3206; G06N 5/04; H04W 4/027; H04W 4/02; H04N 21/4126; H04N 21/41407; H04N 21/4532; H04N 21/4858
See application file for complete search history.

(56) References Cited

U.S. PATENT DOCUMENTS

| | | | |
|---|---|---|---|
| 5,754,962 | A | 5/1998 | Griffin |
| 6,526,411 | B1 | 2/2003 | Ward |
| 2002/0046315 | A1 | 4/2002 | Miller et al. |
| 2003/0148773 | A1 | 8/2003 | Spriestersbach et al. |
| 2004/0098571 | A1* | 5/2004 | Falcon .................. G06F 1/1626 713/1 |
| 2004/0215808 | A1 | 10/2004 | Homma |
| 2005/0086184 | A1 | 4/2005 | Stavely |
| 2006/0156415 | A1 | 7/2006 | Rubinstein |

(Continued)

FOREIGN PATENT DOCUMENTS

WO    WO-2008027836 A2 *    3/2008    ............. B60K 35/00

OTHER PUBLICATIONS

Oliver, "PAPA: Physiology and purpose-aware automatic playlist generation," University of Victoria, 2006, 4 pages.

(Continued)

*Primary Examiner* — Brian F Shaw
(74) *Attorney, Agent, or Firm* — Fish & Richardson P.C.

(57) ABSTRACT

A portable media player may provide multi-modes for a user. Each mode may define different features and content that are customized for a particular mode. Based a selected mode, the media player may provide access to only content, features, hardware, user interface elements, and the like that the user wishes to have access to when the mode is enabled. The media player may provide the user different experiences, looks, and feels for each mode.

18 Claims, 9 Drawing Sheets

(56) References Cited

U.S. PATENT DOCUMENTS

| | | |
|---|---|---|
| 2006/0234781 A1 | 10/2006 | Bosch |
| 2006/0294209 A1 | 12/2006 | Rosenbloom et al. |
| 2007/0072553 A1* | 3/2007 | Barbera ............ H04M 1/72577 |
| | | 455/67.11 |
| 2007/0077958 A1 | 4/2007 | Kalogeropoulos |
| 2007/0182532 A1* | 8/2007 | Lengning ............ G10H 1/0041 |
| | | 340/439 |
| 2007/0201705 A1 | 8/2007 | Dorogusker |
| 2007/0257097 A1 | 11/2007 | Nurmela et al. |
| 2008/0004003 A1 | 1/2008 | Wulff |
| 2008/0256129 A1* | 10/2008 | Salinas .............. H04N 21/4143 |
| 2009/0055426 A1 | 2/2009 | Kalasapur et al. |
| 2009/0138949 A1* | 5/2009 | O'Neill ............ G08G 1/096716 |
| | | 726/6 |
| 2009/0195350 A1 | 8/2009 | Tsern |
| 2010/0008650 A1 | 1/2010 | Bull et al. |

OTHER PUBLICATIONS

Connelly et al., "On Negotiating Automatic Device Configuration in Smart Environments," Proc. PerWare 04 Workshop, 2nd Int'l Conf. Pervasive Comp. And Comm., IEEE CS Press, 2004, 213-218, 6 pages.
Schilit et al., "Context-Aware Computing Applications," Proc. IEEE Workshop Mobile Computing Systems and Applications, IEEE CS Press, Los Alamitos, Calif., 1994, 85-90, 6 pages.

* cited by examiner

MULTI-MODEL MODES OF ONE DEVICE

CROSS-REFERENCES TO RELATED APPLICATIONS

This application is a continuation of and claims priority to U.S. patent application Ser. No. 14/262,560, filed on Apr. 25, 2014, entitled "Multi-Model Modes of One Device", which is a continuation and claims priority to U.S. patent application Ser. No. 12/207,308, filed Sep. 9, 2008 and entitled "Multi-Model Modes of One Device," which claims priority to and the benefit of U.S. Provisional Application No. 61/079,578, filed Jul. 10, 2008 and entitled "Multi-Model Modes of One Device," the entire disclosure of each of which are herein incorporated by reference for all purposes.

FIELD OF THE INVENTION

The present invention relates generally to electronic devices. More particularly, to techniques for providing multiple modes of one device.

BACKGROUND OF THE INVENTION

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

Users listen to, watch, or otherwise receive and consume content in a variety of contexts. For example, it is common to listen to music while driving, riding public transit, exercising, hiking, doing chores, or the like. Additionally, users now are more often using media players to receive radio, television, and satellite broadcasts, Global Positioning and other broadcast-based location services for navigation and recreation in addition to the playback of content stored on the media players.

Conventionally, a media player or portable media player can be capable of playing media, such as audio (e.g., songs) or video (e.g., movies) for the benefit of its user. When playing audio, if the media player includes a display, the display can present the name of the song, artist, and other information pertaining to the song. In the case of playing a video, the display can be used to present the video.

Typically, these media players are statically configure to provide one mode of operation. For example, a typical media player may present one consistent user interface and set of applications to the user at all times. Moreover, even though the user can alter the type of content played by a device, generally, the same content will be available to the user irrespective of the activity of the user.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

In various embodiments, an electronic device, such as a media player or portable media device, may automatically alter a user's experience with the device. The electronic device may include one or more modes, such as music playback mode or video playback mode. Each mode can specify different applications, features, options, settings, or the like that are available to the user when the mode is enabled. Furthermore, each mode may specify applications, features, options, settings, or the like that are unavailable, disabled, or otherwise missing from a user interface to provide a cleaner, more focused user experience. Each mode may additionally specify the content that is available to the user when the mode is available. Accordingly, a media playback device may be automatically "reconfigured" when a particular mode is enabled to provide a user with access settings, applications, content, etc. relevant to a user's current activity, prior usage history, location, or the like.

In some embodiments, an electronic device may include a plurality of modes. Each mode may define or otherwise specify applications, settings, options, features, functionalities, or the like that may be enabled or disabled when the mode is active. The mode may define which applications can be accessed through a graphical user interface (GUI) by a user. The mode may further specify how applications relevant to the mode may be displayed, such as backgrounds, icons, style information, themes, or other information that provides a visual indicator of the active mode. In one embodiment, a mode may specify what hardware features may enabled/disabled during the mode. In another embodiment, a mode may also specify which accessories may be available/unavailable, and further prompt the user to attach or remove a give accessory device.

In further embodiments, a mode may define selection criteria in the form of attributes or other features for selecting which content or other media assets should be accessible or otherwise made available when the mode is enabled. When mode is enabled that is relevant to the user's current activity, usage history, location, or the like, the electronic device provide simplified access to content or other media assets that satisfy the selection criteria. In one embodiment, a media playback device may automatically generate playlists of content or other media assets relevant to the enabled mode.

A further understanding of the nature and the advantages of the inventions disclosed herein may be realized by reference of the remaining portions of the specification and the attached drawings.

BRIEF DESCRIPTION OF THE DRAWINGS

In order to better describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

DETAILED DESCRIPTION OF THE INVENTION

In various embodiments, an electronic device, such as a media player or portable media device, may automatically alter a user's experience with the device. The electronic device may include one or more modes, such as music playback mode or video playback mode. Each mode can specify different applications, features, options, settings, or the like that are available to the user when the mode is enabled. Furthermore, each mode may specify applications, features, options, settings, or the like that are unavailable, disabled, or otherwise missing from a user interface to provide a cleaner, more focused user experience. Each mode may additionally specify the content that is available to the user when the mode is available. Accordingly, a media playback device may be automatically "reconfigured" when a particular mode is enabled to provide a user with access settings, applications, content, etc. relevant to a user's current activity, prior usage history, location, or the like.

In order to better understand one or more of the inventions presented within this disclosure, aspects of at least one environment within which various embodiments may operate will first be described.

Figure 1:
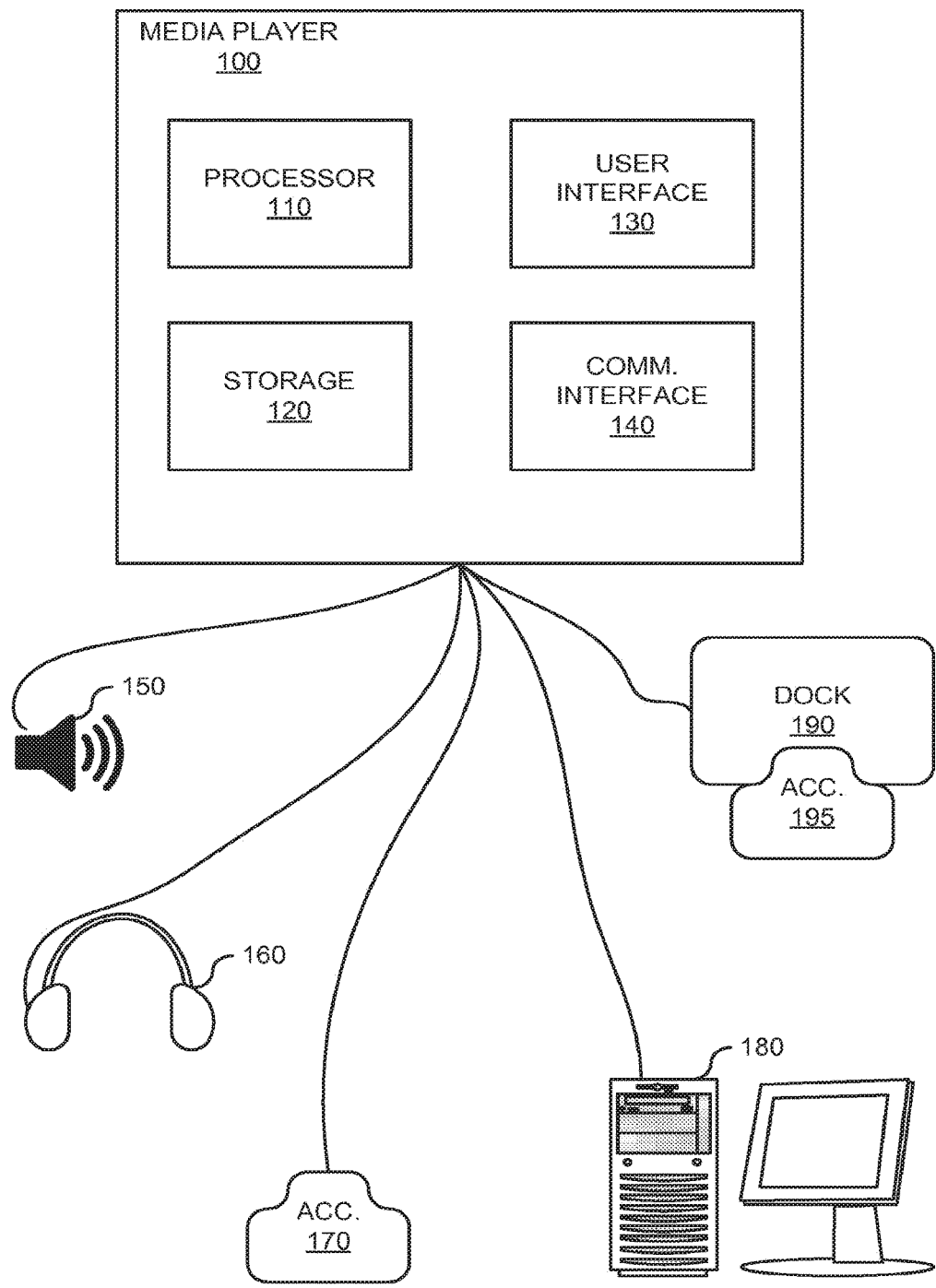
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed. One example of media player 100 is the iPod® media player, which is available from Apple, Inc. of Cupertino, Calif. Another example of media player 100 is a personal computer, such as a laptop or desktop.

In this example, media player 100 includes processor 110, storage 120, user interface 130, and communications interface 140. In general, processor 110 controls various functionalities associated with media player 110. Media play 100 may output audio content, video content, image content, and the like. Media player 100 may further output information associated with content, such as track information and album art.

Typically, a user may load or store content using storage 120. Storage 120 may be any read-only memory (ROM), random access memory (RAM), non-volatile memory, flash memory, floppy disk, hard disk, and the like. A user may interact with user interface 130 of media player 100 to view or consume content. Some examples of user interface 130 are buttons, click wheels, touch pads, touch screens, and other input/output devices.

Media player 100 typically includes one or more connectors or ports, such as communications interface 140, that can be used to load content, retrieve content, interact with applications running on media player 100, interface with external devices, and the like. Some examples of communications interface 140 are universal serial bus (USB) interfaces, IEEE 1394 (or FireWire/iLink®) interfaces, universal asynchronous receiver/transmitters (UARTs), wired and wireless network interfaces, transceivers, and the like.

In one example, a connector or port may enable media player 100 to output audio to a pair of speakers 150. In another example, a connector or port may enable media player to output audio to a pair of headphones 160. In yet another example, a connector or port may enable media player 100 to interface with an accessory 170, a host computer 180, or be inserted into a docking system 190.

Docking system 190 may further enable one or more accessory devices 195 to interface with media player 100. There are today many different types of accessory devices 170 and 195 that can interconnect to media player 100. For example, an accessory may allow a remote control to wirelessly control media player 100. As another example, an automobile can include a connector and media player 100 can be inserted onto the connector or dock such that an automobile media system can interact with media player 100, thereby allowing the media content on the media player to be played within the automobile.

Often, media player 100 receives content or other media assets from a host computer (e.g., host computer 160) that serves to enable a user to manage media assets. As an example, communications interface 130 allows media player 100 to interface with host computer 160 that executes a media management application to manage media assets that can be loaded onto media player 100. One example of a media management application is iTunes®, produced by Apple, Inc. of Cupertino, Calif. Media player 100 may further be connected to private and public communications networks, such as the Internet.

In various embodiments, media player 100 can provide multiple modes of use to a user. Each mode may define or otherwise specify applications, settings, options, features, functionalities, or the like that may be enabled or disabled when the mode is active. The mode may define which applications can be accessed through a graphical user interface (GUI) by a user. The mode may further specify how applications relevant to the mode may be displayed, such as backgrounds, icons, style information, themes, or other information that provides a visual indicator of the active mode. In one embodiment, a mode may specify what hardware features may enabled/disabled during the mode. In another embodiment, a mode may also specify which accessories may be available/unavailable, and further prompt the user to attach or remove a give accessory device.

In further embodiments, a mode may define selection criteria in the form of attributes or other features for selecting which content or other media assets should be accessible or otherwise made available when the mode is enabled. When mode is enabled that is relevant to the user's current activity, usage history, location, or the like, the electronic device provide simplified access to content or other media assets that satisfy the selection criteria. In one embodiment, a media playback device may automatically generate playlists of content or other media assets relevant to the enabled mode.

Accordingly, media player 100 may be automatically configured or "reconfigured" for a mode that identifies what content, functionalities, applications, user interface preferences, or the like, may be available or unavailable to a user according to the preferences or activities of a user. For example, a user of media player 100 may have a workout mode, a relaxation mode, a driving mode, a pre-party mode, and a party mode. Each mode may define different features and content that are customized for the mode. Each mode may specify criteria for selecting which content, such as music or videos, should be made played or otherwise made available when the mode is available. In the example of the workout mode, a graphical user interface (GUI) may include a training or workout application (e.g., NIKE+ functionality by Nike, Inc.) and enable access to accessories and sensors tracked by the application. The GUI may further only provide access to songs from a user's content library that the user wishes to listen to while working out. The GUI may also have a different look and feel for the applications, icons, and the like.

Figure 2:
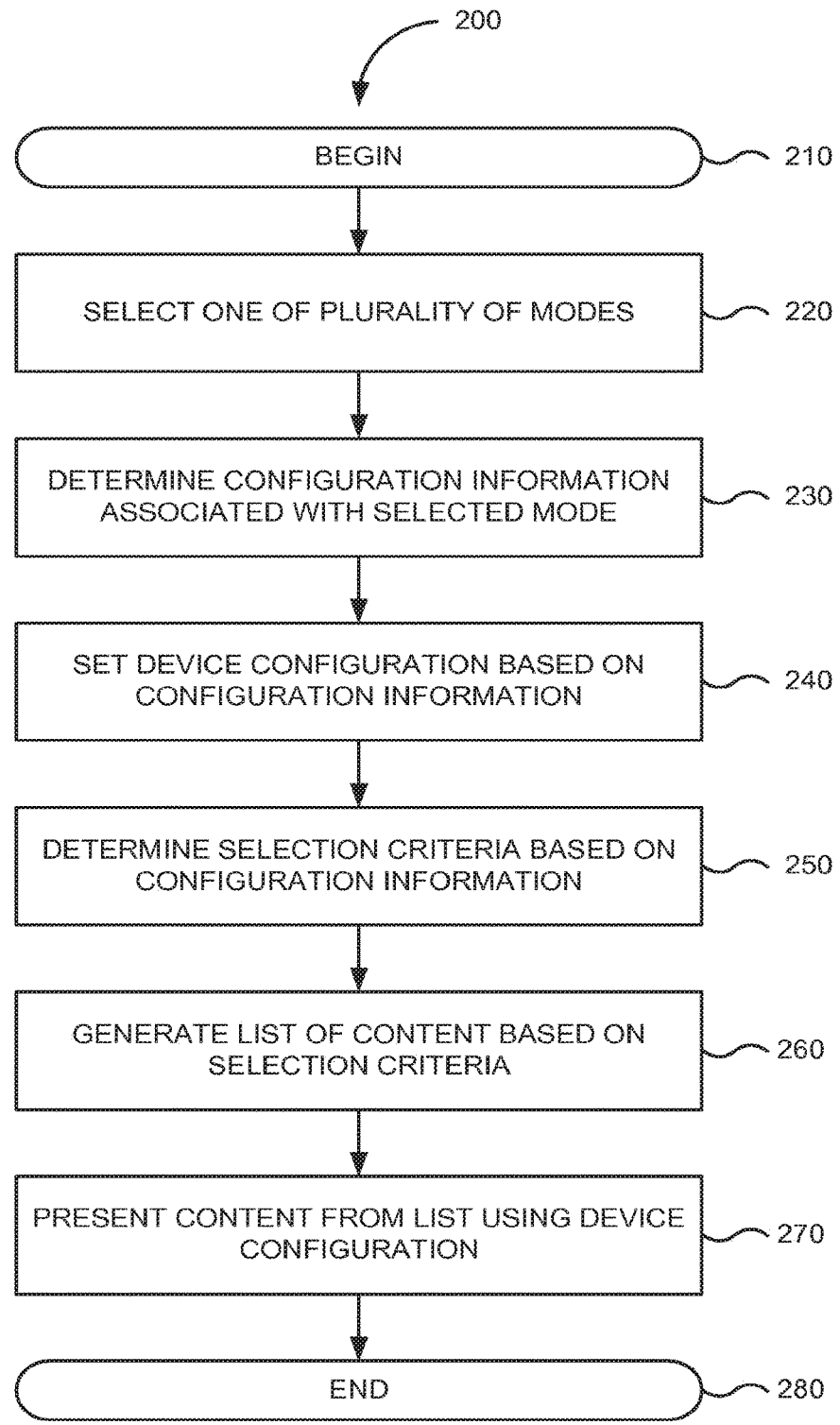
FIG. 2 is a simplified flowchart of a method for configuring a device based on a mode in one embodiment according to the present invention.

FIG. 2 is a flowchart of method 200 for configuring media player 100 based on a mode in one embodiment according to the present invention. The processing depicted in FIG. 2 may be performed by software modules (e.g., instructions or code) executed by processor 110 of media player 100, by hardware modules of media player 110, or combinations thereof with other computer systems. FIG. 2 begins in step 210.

In step 220, one of a plurality of modes is selected. Each mode in the plurality of modes may be related to a different activity of a user. In another example, each mode may be related to a sub-mode, for example, a different version of an audio or video playback mode. In one example, a user may select the mode from a plurality of modes displayed when media player 100 powers up. In another example, a default mode (or last used mode) of the device can be automatically selected. A user may also manually change modes by selecting a mode from a list of modes displayed in a configuration or settings menu associated with media player 100.

In some embodiments, the mode may be selected automatically. For example, the mode may be automatically selected based on time, date, location, usage history, user schedule, or occurrence of an event. In yet another example, the mode may be selected based on characteristics, attributes, or features of content or other media assets, such as the type of content, the volume of the content, or the like. In some embodiment, the mode may be selected based on whether an accessory is present, biometric data of a user, or the like.

In step 230, configuration information associated with the selected mode is determined. The configuration information can include any information for configuring a device. For example, the configuration information may include information specifying how to display a graphical user interface. The configuration information may include information specifying how a user is able to interface with elements of a graphical user interface or other user interface elements, such as buttons, click wheels, touch screens, or the like. The configuration information may further include information specifying which applications are available during the selected mode. The configuration information may also include information specifying what content or other media assets are accessible during the selected mode.

In step 240, the configuration of a device is set based on the configuration information. For example, one or more settings or preferences may be enabled or disabled. In another example, the background, color, icons, themes, visual effects, or the like, of a GUI may be enabled/disabled. In one embodiment, the user may be prompted to attach a given accessory device or remove an attached accessory device. Setting the configuration of the device may include routing content or other media assets to an accessory device. In yet another embodiment, a media library may be configured to limit access to the library to a subset of content or other media assets stored on a device.

In step 250, selection criteria is determined based on the configuration information. Selection criteria can include any rules, conditions, or other criteria for selecting content or other media assets. In one example, the selection criteria may specify one or more characteristics, attributes, qualities, identifiers, or the like, to be matched to content or metadata associated with content.

In step 260, a list of content is generated based on the selection criteria. For example, selection criteria specifying a genre of "Rock" may cause the generation of a list of songs tagged with the "Rock" genre. In another example, a playlist of content associated with a given artist may be generated for selection criteria identifying the artist. In some embodiments, the selection criteria may be used to generate one or more queries against a media library to obtain the list of content. In other embodiments, content may be determined based on whether the content satisfies the selection criteria. In yet another example, the selection criteria may specify content to be excluded from the list of content.

In step 270, content is presented from the list of content using the device configuration set in step 240. For example, content selected for a mode may be played by media player 100 with GUI elements, applications, or the like, enabled for the selected mode. FIG. 2 ends in step 280.

Accordingly, media player 100 may be quickly configured to the preference or activity of a user defined by a particular mode. Additionally, the user may be presented with only those GUI elements, applications, content, and other functionality that the user desires when the selected mode is enabled.

Figure 3A:
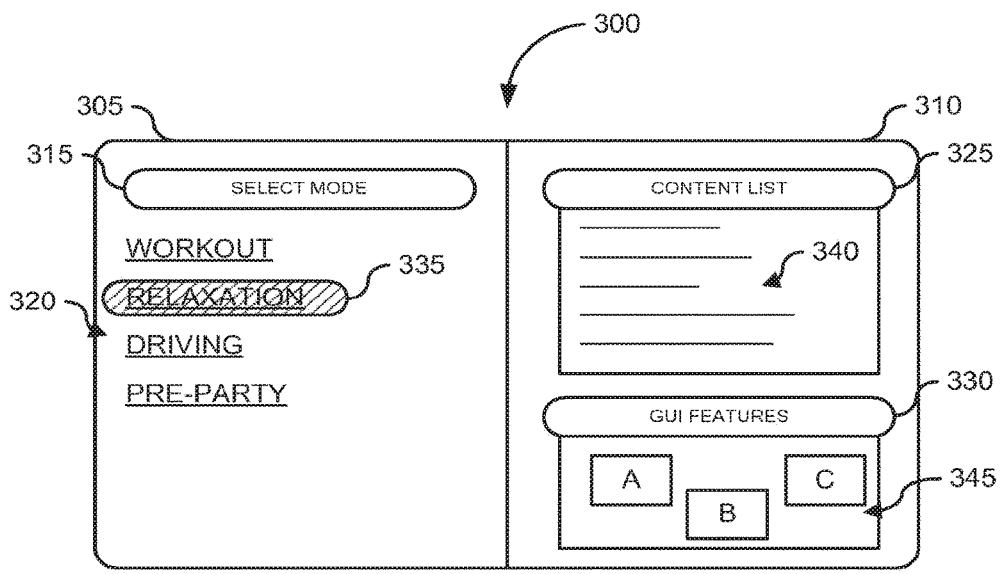
FIGS. 3A and 3B are examples of a graphical user interface that may be configured according to modes in one embodiment according to the present invention.
Figure 3B:
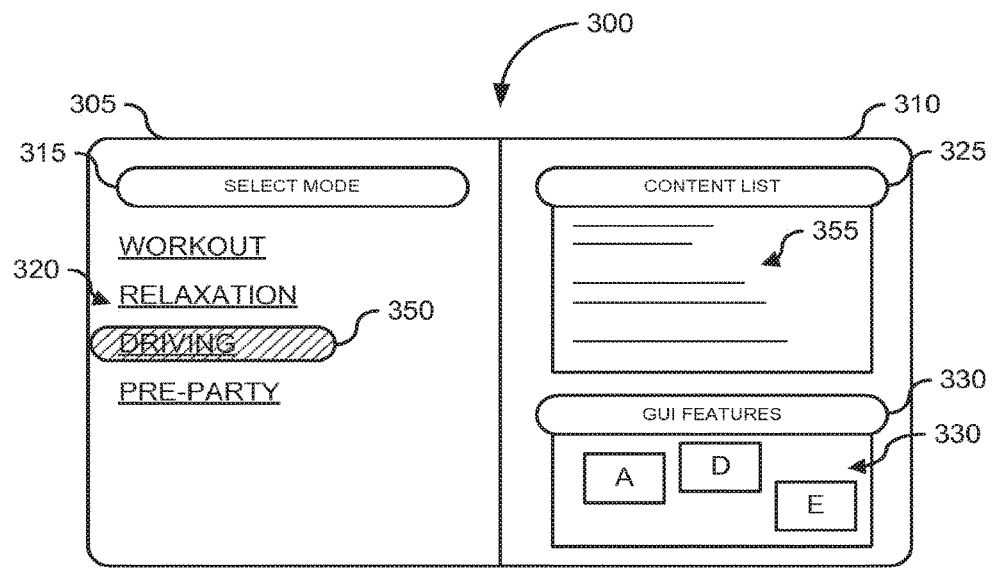

FIGS. 3A and 3B are examples of graphical user interface (GUI) 300 that may be configured according to modes in one embodiment according to the present invention. Referring to FIG. 3A, GUI 300 can include display area 305 and display area 310 positioned to the right of display area 305. Display area 305 may include GUI element 315 entitled "Select Mode" and a list of modes 320 (e.g., "workout," "relaxation," "driving," and "pre-party"). Display area 310 may include GUI element 325 entitled "Content List" and GUI element 330 entitled "GUI Features."

In this example, a user can select the mode entitled "RELAXATION" from the list of modes 320. GUI 300 then may display the user selection using GUI element 335 positioned over the words RELAXATION in the list of modes 320 and which appears as a hatched rectangle with rounded corners. Upon selecting the relaxation mode, GUI 300 can update GUI element 325 with a listing of content 340 associated with the relaxation mode. For example, the listing of content 340 may include a list of filenames, genres, artists, and the like. GUI 300 further may update GUI element 330 with a listing or preview of GUI elements 345 (e.g., GUI elements A, B, and C) that may be available during the relaxation mode. Listing or preview of GUI elements 345 may include applications, icons, themes, and the like and their associated layout.

Referring to FIG. 3B, in this example, a user can select the driving mode from the list of modes 320. GUI 300 then may display the user selection using GUI element 350 positioned over the words DRIVING in the list of modes 320 and which appears as a hatched rectangle with rounded corners. Upon selecting the driving mode, GUI 300 can update GUI element 325 with a listing of content 355 associated with the driving mode. For example, the listing of content 355 may include a list of songs, albums, time periods, beats, and the like. GUI 300 further may update GUI element 330 with a listing or preview of GUI elements 360 (e.g., GUI elements A, D, and E) that may be available during the during mode.

Listing or preview of GUI elements 360 may include applications, representations of interfaces with external devices (e.g., a car radio dock), icons, themes, and the like and their associated layout.

Figure 4A:
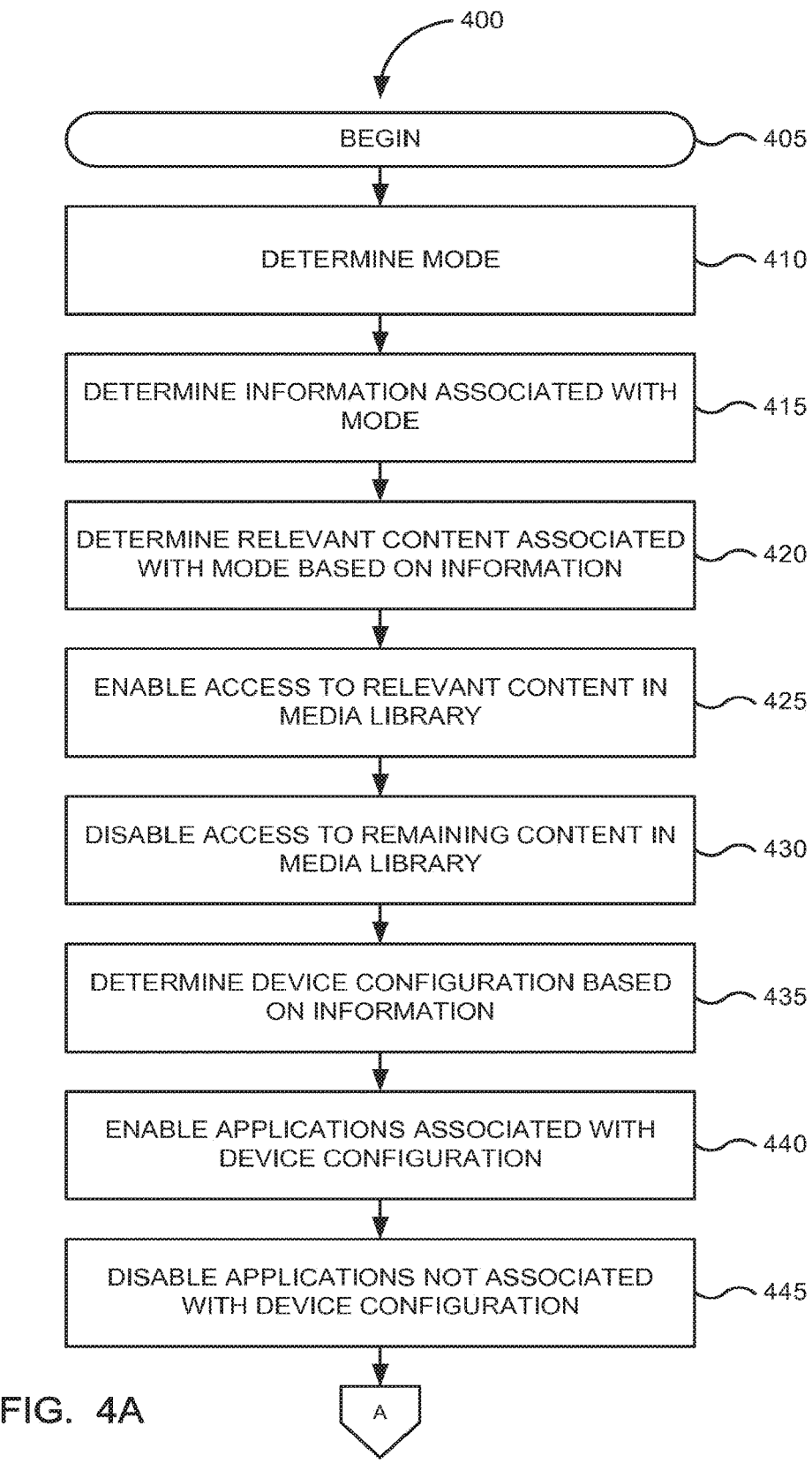
FIGS. 4A and 4B are a flowchart of a method changing functionality of a device based on a mode in one embodiment according to the present invention.
Figure 4B:
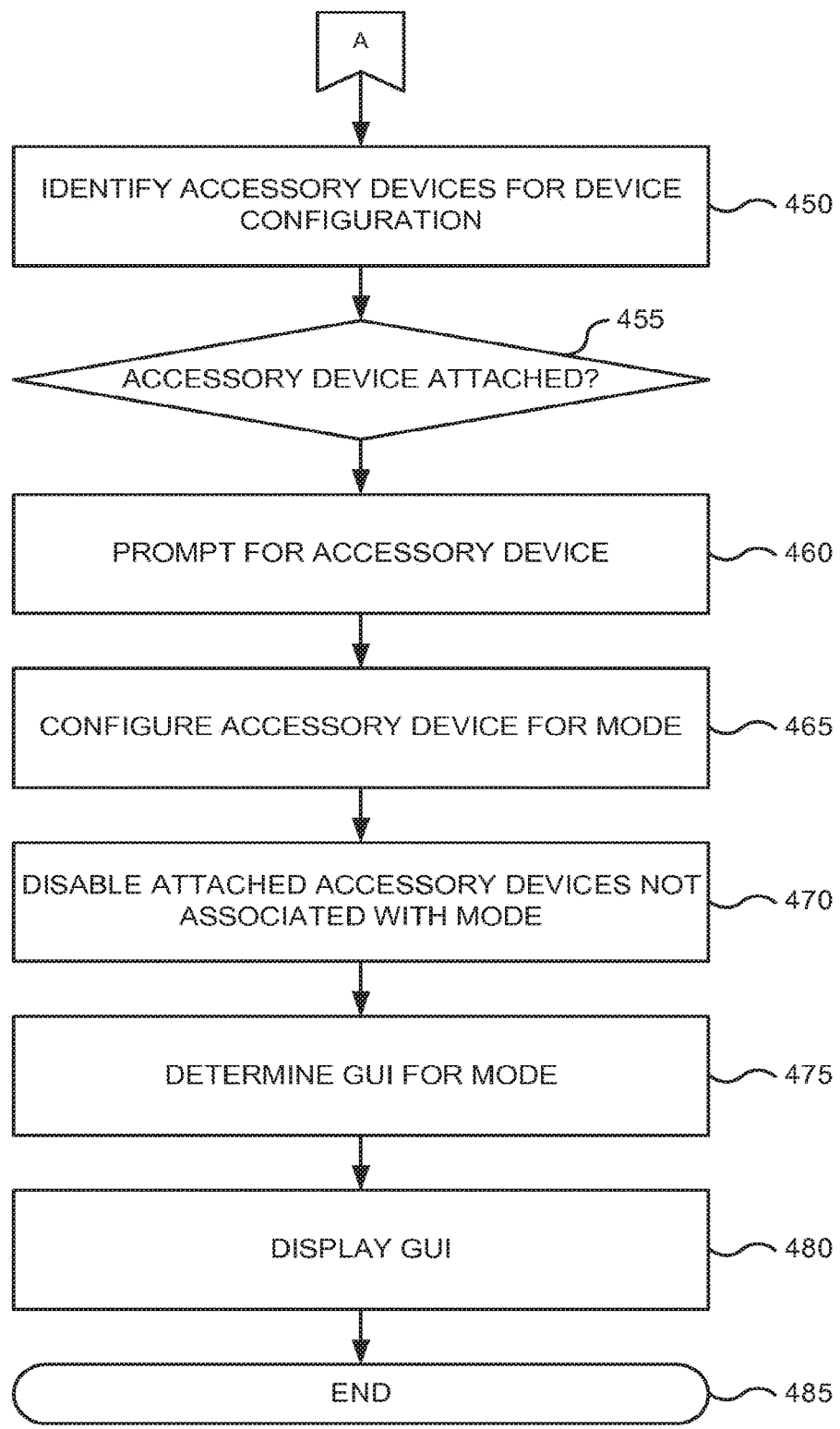

FIGS. 4A and 4B are a flowchart of method 400 changing functionality of a device based on a mode in one embodiment according to the present invention. FIG. 4A begins in step 405.

In step 410, a mode is determined. For example, an electronic device may determine the mode from a user selection of a mode identifier from a list. In another example, the mode may be determined automatically based on the device's or user's location, content playback history, usage, schedule information, or the like. The mode may be automatically determined based on an accessory device coupled to an electronic device. For example, a pre-determined mode may be determined when an electronic device is coupled to a car stereo. In another example, a pre-determined mode may be determined when an electronic device is coupled to a docking station or home theater system.

In step 415, information associated with the mode is determined. For example, a mode definition file may be consulted to determine content attributes and selection criteria, mode specific GUI elements, mode specific applications, hardware and accessories to be enabled/disable, and the like. In another example, information associated with a mode may be retrieved from a library or registry.

In step 420, relevant content associated with the mode is determined based on the information. For example, an electronic device, such as media player 100 of FIG. 1, may select content from a media or content library that satisfies one or more attributes or selection criteria defined by the mode. In another example, the relevant content may be determined based on playlists or other content identifiers that a user has associated with the determined mode.

In step 425, access to the relevant content associated with the mode is enabled in a media library. In one example, content or other media assets may be marked or flagged as enabled. In another example, a query engine may be configured to filter access to the relevant content. In step 430, access to any remaining content not associated with the mode is disabled. For example, media player 100 may mark or flag certain content as disabled. In another example, a query engine may be configured to filter access only to the relevant content.

In step 435, a device configuration is determined based on the information. As discussed above, the device configuration may include information specifying what hardware or software elements are available or unavailable during the determined mode. In step 440, one or more applications associated with the determined device configuration are enabled. In one embodiment, the mode may specify the one or more applications by name, identifier, or the like. In one example, media player 100 may enable links or menu items to the one or more applications in a GUI. In step 445, one or more applications not associated with the determined device configuration are disabled. In another example, media player 100 may disable or remove links or menu items to applications not associated with the device configuration in the GUI. The processing of method 400 continues in step 445 of FIG. 4B.

Referring to FIG. 4B, in step 445, accessory devices associated with the determined device configuration are determined. In step 455, a determination is made whether an accessory device used for the determined mode is attached to the electronic device. In step 455, if a determination is made that an accessory device used for the determined mode is not attached, in step 460, a prompt is made for the accessory device. For example, media player 100 may display a dialog on a graphical user interface prompting the user to attach the accessory device. In another example, media player 100 may include an audio user interface that prompts the user to attach the accessory device.

In step 455, if a determination is made that an accessory device used for the determined mode is attached or after prompting for the accessory device in step 460, any attached accessory devices associated with the mode are configured (or enabled) in step 465. If accessory devices are not attached in step 455 or not associated with the mode, in step 470, the accessory devices are disabled.

In step 475, GUI is determined for the mode. The determined GUI may include layout information, placement information, accessibility information, or the like. For example, media player 100 may determine placement and arrangement of any applications that have been enabled by the mode. Media player 100 may further determine the look and feel of the GUI. Each mode may have different themes, icons, tiles, visual effects, animations, color schemes, or the like. In various embodiments, elements and layout of a mode GUI are determined based on the information associated with the mode. The elements may include windows, icons, dialogs, buttons, and the like. The layout specifies where a GUI element is positioned relative to a display area, application window, dialog, or to one or more other GUI elements. In step 480, the GUI is displayed. FIG. 4B ends in step 485.

Figure 5:
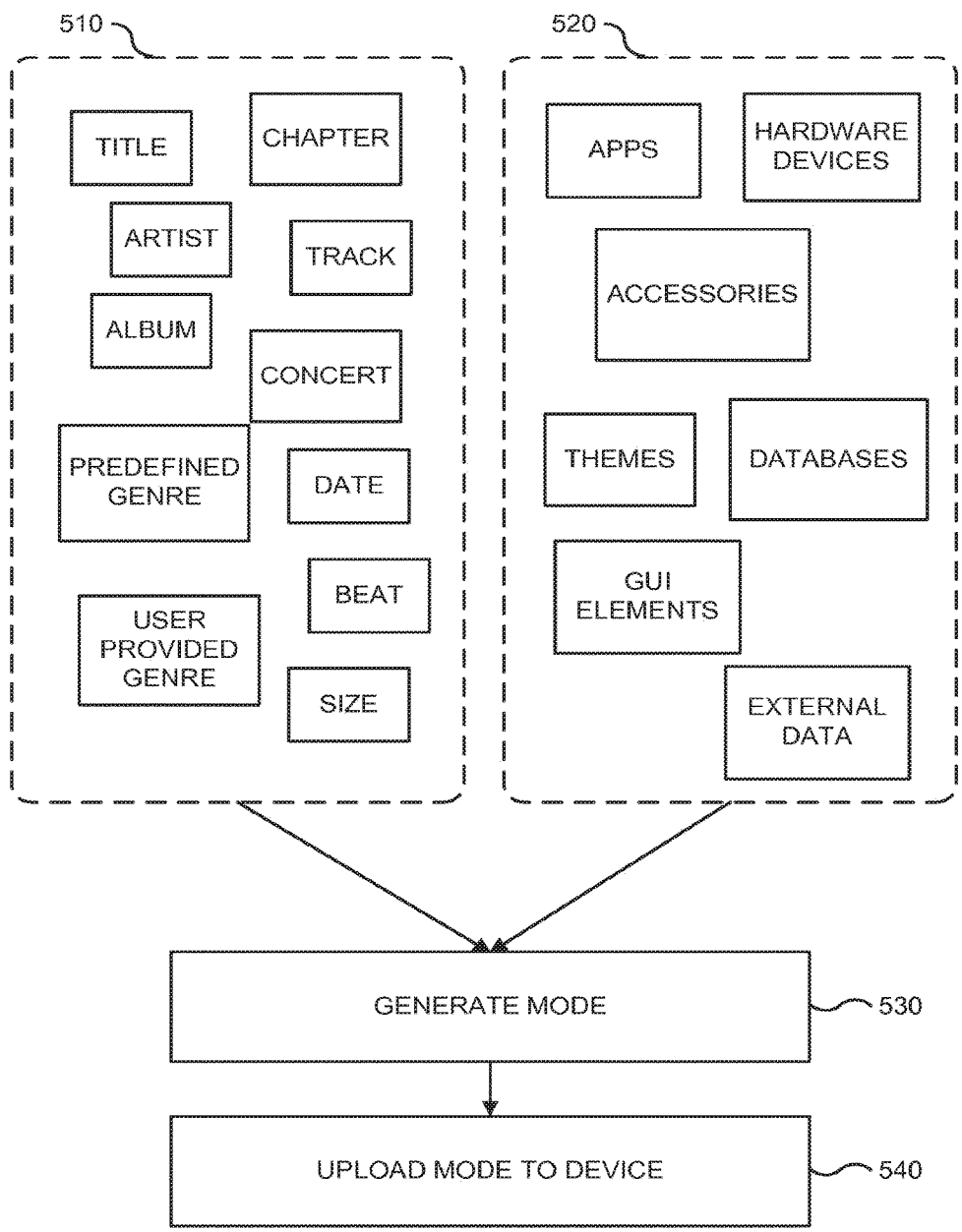
FIG. 5 is a block diagram illustrating various attributes and other criteria that may be used to generate a mode in one embodiment according to the present invention.

FIG. 5 is a block diagram illustrating various attributes and other criteria that may be used to generate a mode in one embodiment according to the present invention. For example, a media playback device may have two default modes, music playback and video playback. In the default music playback mode, a user may have access to all applications related to music playback and all music content. The GUI of the media playback device may include a theme or color scheme indicative of the default music playback mode. In the default video playback mode, a user may have access to all applications related to video playback and all video content. The GUI of the media playback device may include a theme or color scheme indicative of the default video playback mode.

In various embodiments, a user can create multiple modes of the default music playback mode or the default video playback mode. For example, selection criteria information 510 and device configuration information 520 can be used to define or otherwise configure modes of the media playback device, where each defined mode may be a sub-mode or multi-mode of the default music or video playback modes.

Selection criteria information 510 can include information for identifying, determining, or selecting content or other media assets for a mode. For example, information 510 may include information about a title, artists, album, pre-defined genre, user-defined or user-provided genre, chapter, track, concert, date, beat, size or the like. Device configuration information 520 can include information for identifying, selecting, or setting functionality of hardware and/or software elements of the media playback device. For example, information 520 may include information about applications, hardware modules or devices, accessories, databases, themes, GUI elements, and other external data sources.

In block 530, a user can employ selection criteria information 510 and device configuration information 520 to create or otherwise configure a mode of the portable media playback device. Information defining the mode, such as a mode definition file, may be stored on the media playback device. In one embodiment, a user may interact with an application on an host computer, and in block 540, upload the created mode to the media playback device.

In one example of operation, a user may configure one or more sub-modes or multi-modes of the default music playback mode. For example, the user may create a "workout" mode as a multi-mode of the default music playback mode. The "workout" mode may specify the type of style of music to be played back when the "workout" mode is enabled. Thus, a given sub-set of all available music accessible when the default music playback mode is enabled may be made available or otherwise accessible when a sub-mode or multi-mode is enabled. The user may further specify the look and feel of the GUI and what applications/hardware/accessory device are accessible when the "workout" mode is enabled.

In another example of operation, the user may create a "relaxation" mode as a sub-mode or multi-mode of the default music mode. The "relaxation" mode may specify a set of playlists for music to be played back when the "relaxation" mode is enabled. The user may further specify the look and feel of the GUI and what applications/hardware/accessory device are accessible when the "relaxation" mode is enabled.

Figure 6:
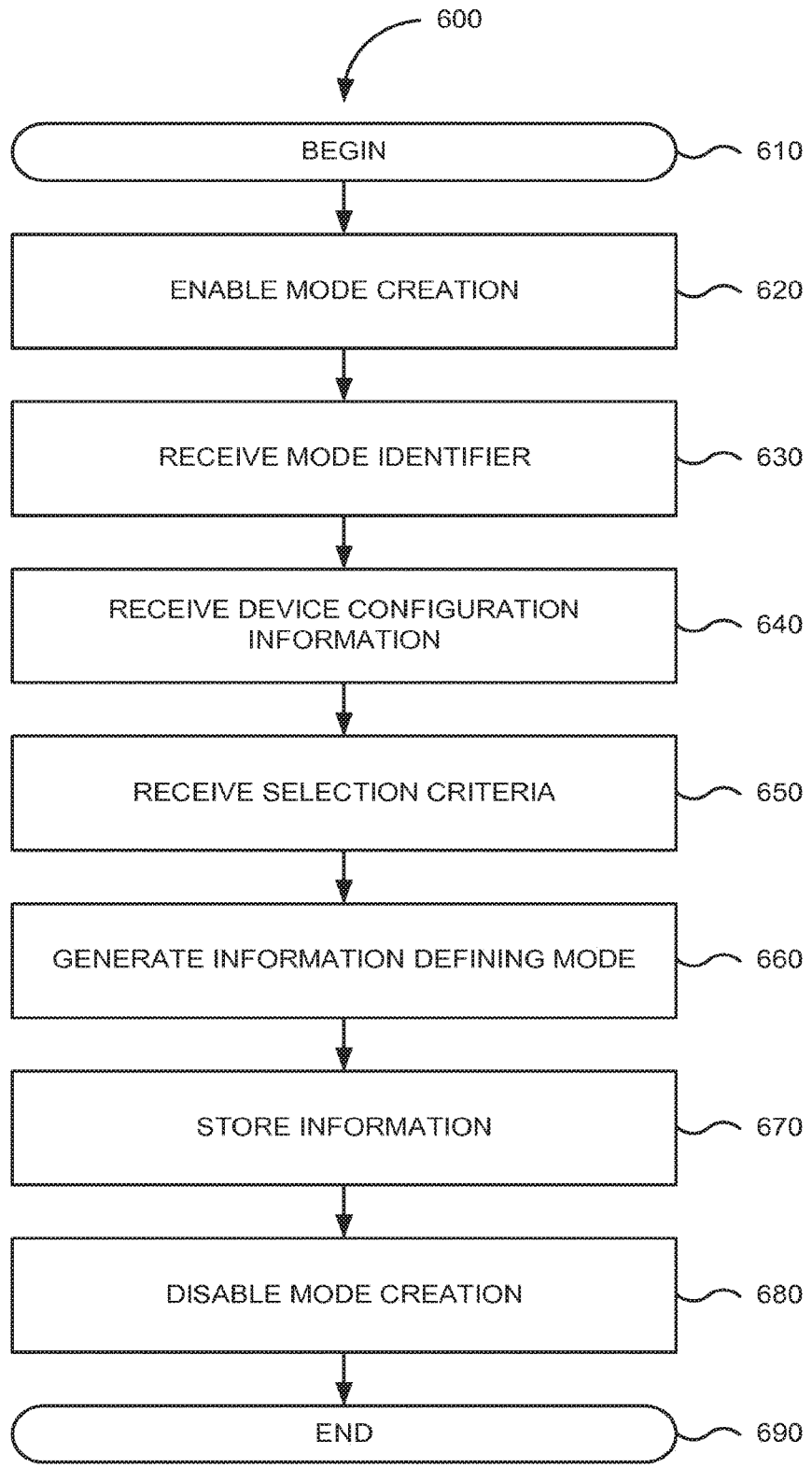
FIG. 6 is a flowchart of a method for creating a mode in one embodiment according to the present invention.

FIG. 6 is a flowchart of method 600 for creating a device mode in one embodiment according to the present invention. FIG. 6 begins in step 610.

In step 620, mode creation is enabled. For example, a user may interact with a configuration application that allows the user to create or build different modes or establish sub-modes or multi-modes of another existing mode. The application may be executed on media player 100 of FIG. 1 or on host computer 160, for example. In one embodiment, a user may also create modes using a web browser connected to a web site. The user then may save the created mode on media player 100, or upload a mode definition file to media player 100. The user may also create a mode and share the mode with users of different media players. Additionally, a user or organization may create a mode to be distributed along with content or applications sold or carried by the user or organization.

In step 630, a mode identifier is received. The mode identifier may include any set of characters or symbols. The mode identifier may include a name for the mode. Some examples of names are "My mode," "Mode #1," "Bob's party settings," "His car," "Her car," or the like.

In step 640, device configuration information is received. For example, a user may edit device configuration settings for a default or standard mode. In another example, a user may copy an existing mode and change the device configuration to suit the users needs. In yet another example, a user may start with a blank device configuration, establish one or more configuration items or values in the configuration, and leave unidentified configuration items to be resolved at run-time.

In step 650, selection criteria is received. For example, the user may specify a title, artist, album, chapter, track, concert, a predefined genre, a user provided genre, date, beat, size, and other attributes associated with content that should be made available or otherwise accessible when the mode is enabled. In one example, a user may associate a particular artist with Mode A. When Mode A is selected, media player 100 may only display content, such as songs, written by or performed by the particular artist that the user has in a media library. Additionally, media player 100 may automatically build a playlist that includes songs associated with the particular artist. In some embodiments, media player 100 may obtain artwork, statistics, biographies about the particular artist, or the like, for display to the user while Mode A is enabled.

In another example, a user may associate a particular date with Mode B. When Mode B is selected, media player 100 may only display content associated with the particular date that the user has in a media library. For example, media player 100 may only display those songs written, recorded, or performed during 1987.

In step 660, information defining the mode is generated. In one embodiment, a mode definition file can be created. In another example, information associated with the mode may be created in a library or registry. In step 670, the mode is stored. The mode may be stored on an electronic device or a host device. In step 680, mode creation is disabled. FIG. 6 ends in step 690.

In various embodiments, accordingly, an electronic device, such as media player 100, can use information associated with a mode to determine the content associated with the mode and also functionalities of media player 100 for the mode. Thus, a single mode for music playback may have many multi-modes each with a different look, feel, and selection of content. In another example, a user may associated a particular set of applications with a given multi-mode. When the particular multi-mode is enabled, media player 100 may only provide access to the particular set of applications. For example, during a workout, a user may connect an accessory to media player 100 to receive sensor data from a pedometer or a pair of shoes. The user may configure media player 100 to predominantly display an application that tracks the progress of a user's workout based on the sensor data.

Figure 7:
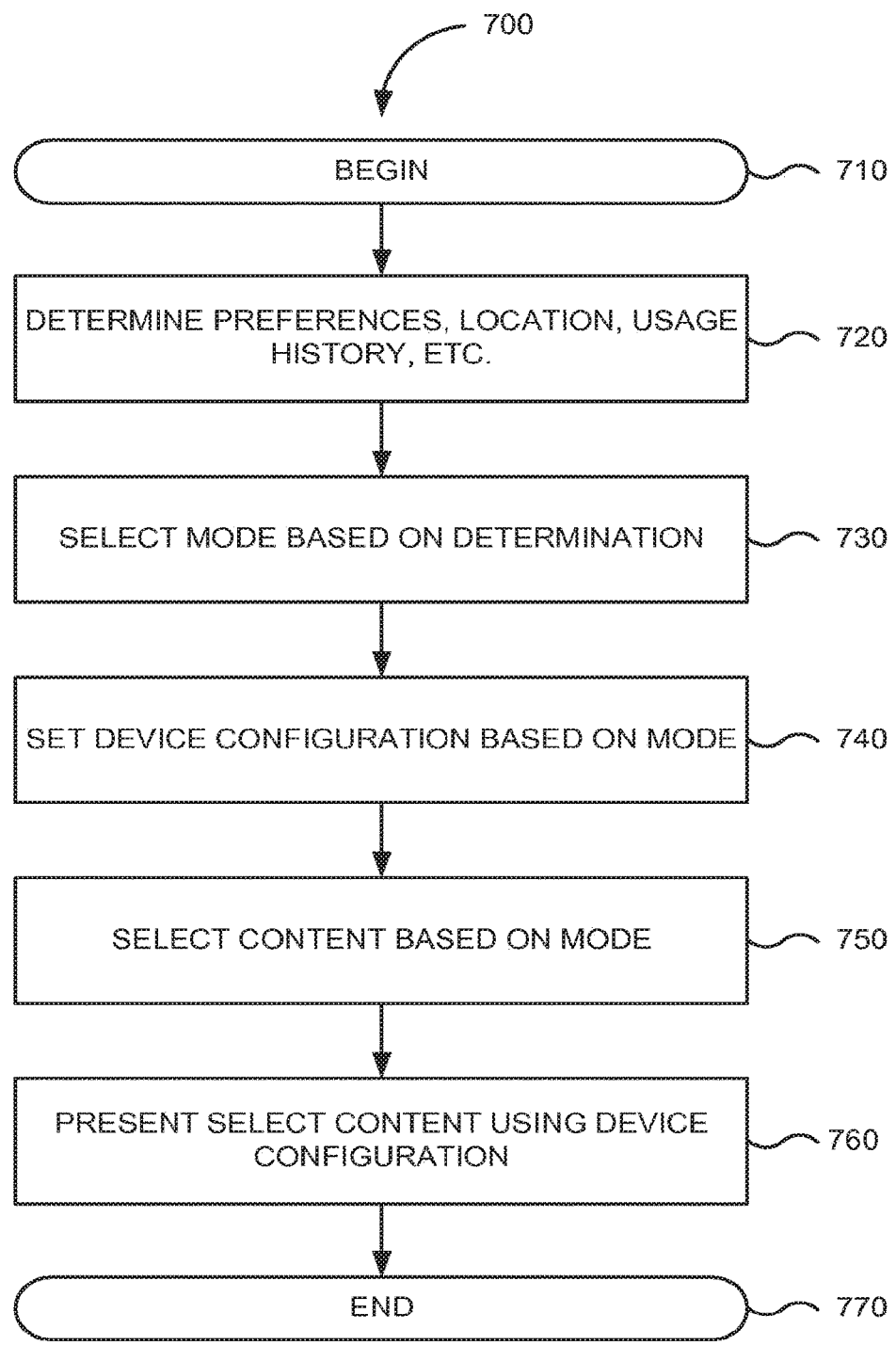
FIG. 7 is are a flowchart of an alternative method for changing functionality of a device based on a mode in one embodiment according to the present invention.

As discussed above, in various embodiments, a mode may be selected or enabled based on a variety of factors, both internal and external. FIG. 7 is a flowchart of alternative method 700 for changing functionality of a device based on a mode in one embodiment according to the present invention. FIG. 7 begins in step 710.

In step 720, one or more preferences, location information, usage history information, etc. are determined. For example, an electronic device may detect an accessory for a car audio system and recognize its location to be inside a car. In another example, an electronic device may determine that it is 9:30 AM, and that between 9 AM and 6 PM, the device's owner should be at work. In a further example, an electronic device may that during a particular time span each day of the week, a group of songs are listened to more frequently. In yet another example, a GPS unit or other location information providing device may provide the physical location of the device.

In step 730, a mode is selected based on the determination. For example, a daily commute mode may be selected based on detecting the accessory for the car audio system. In another example, an easy listening mode may be selected during work hours. In yet another example, a classical music mode may be selected on Sunday mornings. In a further example, a classical guitar rock mode may be selected when the device is found to be positioned or located between a first and second geographic location. A hard rock mode may be selected when the device is found to be positioned or located between the second geographic location and a third location, such as when a jogger or bicyclist transitions from flat terrain to an uphill climb.

In step 740, the device configuration is set based on the mode. For example, the GUI may be changed or updated, access to applications may be enabled or removed, access to accessory devices may be requested or disabled, or the like.

In step 750, content is selected based on the mode. For example, when the daily commute mode may be selected, access may be provided to a series of podcasts or downloaded newscasts. In another example, for the classical guitar rock mode a playlist may be generated for content that satisfies the classical guitar genre and for the hard rock mode another playlist may be generated for content from one or more hard rock artists or bands.

In step 760, the selected content is presented using the device configuration. Accordingly, an electronic device may have a different look and feel for each mode, and present different content for each mode. A user may create sub-modes or enable multi-modes of a device, such that the device may present content and user interface elements that can be specified or relevant to a user's situation, location, activity, or environment.

Figure 8:
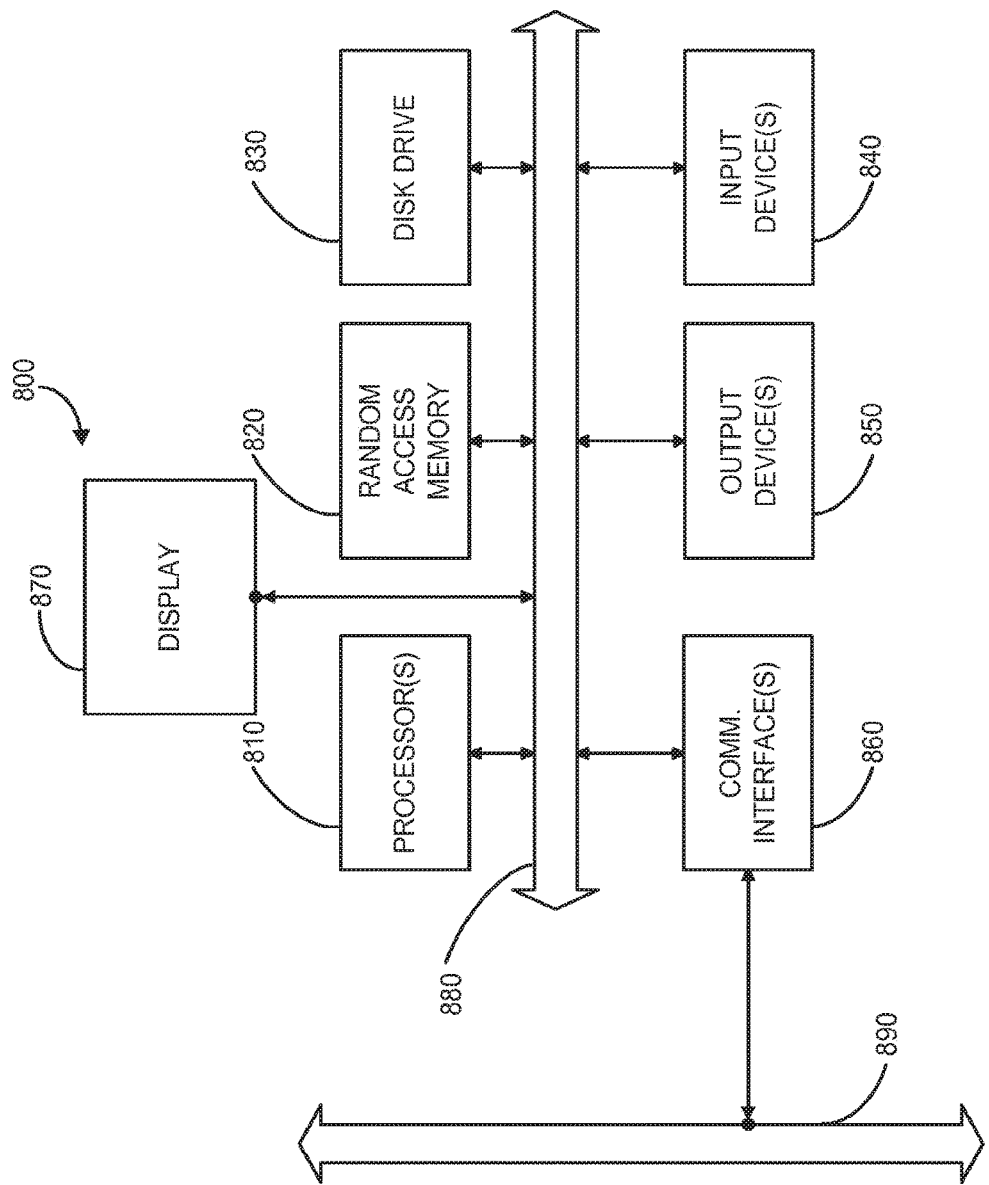
FIG. 8 is a simplified block diagram of a computer system that may incorporate embodiments of the present invention.

FIG. 8 is a simplified block diagram of a computer system 800 that may incorporate embodiments of the present invention. FIG. 8 is merely illustrative of an embodiment incorporating the present invention and does not limit the scope of the invention as recited in the claims. One of ordinary skill in the art would recognize other variations, modifications, and alternatives.

In one embodiment, computer system 800 includes processor(s) 810, random access memory (RAM) 820, disk drive 830, input device(s) 840, output device(s) 850, display 860, communications interface(s) 870, and a system bus 880 interconnecting the above components. Other components, such as file systems, storage disks, read only memory (ROM), cache memory, codecs, and the like may be present.

RAM 820 and disk drive 830 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 840 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 840 may allow a user to select objects, icons, text, and the like, via a command such as a click of a button or the like. In various embodiments, output device 850 is typically embodied as a display, a printer, a force-feedback mechanism, an audio output, a video component output, and the like. Display 860 may include a CRT display, an LCD display, a Plasma display, and the like.

Embodiments of communications interface 870 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 890, to a FireWire bus, or the like. In other embodiments, these computer interfaces may be physically integrated on the motherboard or system board of computer system 800, and may be a software program, or the like.

In various embodiments, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 800 may also include an operating system, such as Microsoft Windows®, Linux®, Mac OS X®, real-time operating systems (RTOSs), open source and proprietary OSs, and the like.

FIG. 8 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smartphone, and the like. In still other embodiments, the techniques described above may be implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
at a portable electronic device:
detecting, at a docking system interface of the portable electronic device, that the portable electronic device has been connected to a media system of an automobile;
identifying, from among a collection of mode definitions stored on the portable electronic device, a driving mode definition that defines a driving mode of the portable electronic device and includes data usable to enable the portable electronic device to determine information for configuring functionality of the portable electronic device based on the driving mode; and
in response to detecting that the portable electronic device has been connected to the media system of the automobile, automatically entering the driving mode, wherein automatically entering the driving mode includes:
in accordance with the driving mode definition, providing access to a first subset of content stored on the portable electronic device that is accessible in the driving mode while preventing access to a second subset of content stored on the portable electronic device that is unavailable in the driving mode, wherein preventing access to the second subset of content comprises removing or disabling links to access the second subset of content; and
updating a graphical user interface of the portable electronic device to represent, on the graphical user interface, applications that are available in the driving mode.

2. The method of claim 1, wherein the first subset of content includes at least one of podcasts or newscasts.

3. The method of claim 1, wherein the first subset of content includes content frequently experienced during a time span that corresponds to a time at which the portable electronic device enters the driving mode.

4. The method of claim 1, comprising entering a daily commute mode.

5. The method of claim 4, wherein the daily commute mode is entered based on a location of the portable electronic device.

6. The method of claim 4, wherein the daily commute mode is entered based on a time at which the portable electronic device enters the driving mode.

7. A portable electronic device comprising:
a graphical user interface;
a docking system interface, the docking system interface comprising a connector to which a media system of an automobile can be connected;
at least one storage device storing a collection of mode definitions; and
at least one processor configured to perform operations comprising:
detecting, at the docking system interface, that the media system of the automobile is connected;
identifying from among the collection of mode definitions, a driving mode definition that defines a driving mode of the portable electronic device and includes data usable to enable the portable electronic device to determine information for configuring functionality of the portable electronic device based on the driving mode; and
in response to detecting that the media system of the automobile is connected, automatically entering the driving mode, wherein automatically entering the driving mode includes:
in accordance with the driving mode definition, providing access to a first subset of content stored on the portable electronic device that is accessible in the driving mode while preventing access to a second subset of content stored on the portable electronic device that is unavailable in the driving mode, wherein preventing access to the second subset of content comprises removing or disabling links to access the second subset of content; and
updating the graphical user interface to represent, on the graphical user interface, applications that are available in the driving mode.

8. The portable electronic device of claim 7, wherein the first subset of content includes at least one of podcasts or newscasts.

9. The portable electronic device of claim 7, wherein the first subset of content includes content frequently experienced during a time span that corresponds to a time at which the portable electronic device enters the driving mode.

10. The portable electronic device of claim 7, the operations comprising entering a daily commute mode.

11. The portable electronic device of claim 10, wherein the daily commute mode is entered based on a location of the portable electronic device.

12. The portable electronic device of claim 10, wherein the daily commute mode is entered based on a time at which the portable electronic device enters the driving mode.

13. At least one non-transitory computer-readable medium storing instructions operable to cause a portable electronic device to perform operations comprising:
detecting, at a docking system interface of the portable electronic device, that the portable electronic device has been connected to a media system of an automobile;
identifying, from among a collection of mode definitions stored on the portable electronic device, a driving mode definition that defines a driving mode of the portable electronic device and includes data usable to enable the portable electronic device to determine information for configuring functionality of the portable electronic device based on the driving mode; and
in response to detecting that the portable electronic device has been connected to the media system of the automobile, automatically entering the driving mode, wherein entering the driving mode includes:
in accordance with the driving mode definition, providing access to a first subset of content stored on the portable electronic device that is accessible in the driving mode while preventing access to a second subset of content stored on the portable electronic device that is unavailable in the driving mode, wherein preventing access to the second subset of content comprises removing or disabling links to access the second subset of content; and
updating a graphical user interface of the portable electronic device to represent, on the graphical user interface, applications that are available in the driving mode.

14. The non-transitory computer-readable medium of claim 13, wherein the first subset of content includes at least one of podcasts or newscasts.

15. The non-transitory computer-readable medium of claim 13, wherein the first subset of content includes content frequently experienced during a time span that corresponds to a time at which the portable electronic device enters the driving mode.

16. The non-transitory computer-readable medium of claim 13, the operations comprising entering a daily commute mode.

17. The non-transitory computer-readable medium of claim 16, wherein the daily commute mode is entered based on a location of the portable electronic device.

18. The non-transitory computer-readable medium of claim 16, wherein the daily commute mode is entered based on a time at which the portable electronic device enters the driving mode.

\* \* \* \* \*